March 18, 1930.  B. H. TER BEEST  1,751,061
VALVE FOR WATER SOFTENERS
Filed Aug. 9, 1928  3 Sheets-Sheet 1

March 18, 1930. B. H. TER BEEST 1,751,061
VALVE FOR WATER SOFTENERS
Filed Aug. 9, 1928    3 Sheets-Sheet 2

Inventor:
Benjamin H. Ter Beest
By

March 18, 1930.  B. H. TER BEEST  1,751,061
VALVE FOR WATER SOFTENERS
Filed Aug. 9, 1928  3 Sheets-Sheet 3
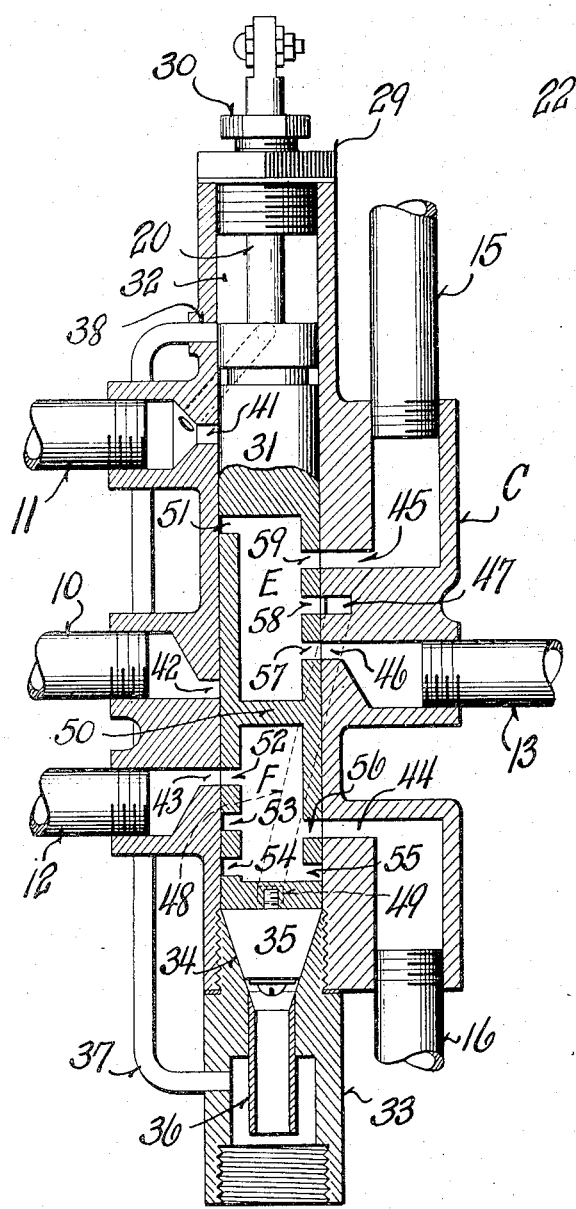

Patented Mar. 18, 1930

1,751,061

UNITED STATES PATENT OFFICE

BENJAMIN H. TER BEEST, OF MADISON, WISCONSIN

VALVE FOR WATER SOFTENERS

Application filed August 9, 1928. Serial No. 298,531.

This invention relates to valves for water softeners and to the associated parts.

Objects of this invention are to provide a novel form of water softener in which a water softening tank equipped with minerals and a brine tank are provided, in which the brine tank is divided off adjacent its bottom to provide a relatively small compartment from which a measured charge of brine may be automatically withdrawn and forced through the softener tank, and in which the brine from the upper portion of the tank percolates into the fresh water which replaces the brine in the lower portion of the tank and thus forms a further measured charge of brine for a subsequent operation of the apparatus.

When salt is added to the salt tank, it is obvious that a certain amount of room is taken up by the salt. This invention has for its further object to provide means for removing a portion of the water remaining in the salt tank after each cycle of operations so that when the salt is finally used up, there is sufficient room left for the addition of the new salt without causing an overflow of the salt tank.

Further objects are to provide a novel valve for a water softener which is so constructed that it will cooperate with a brine supply tank and with a water softener tank to allow the passage of the hard water through the softener and to the service mains in one position, which will allow the flow of the brine through the water softening tank in another position, and which will allow washing water to pass through the softener tank when the valve is in a third position.

Further objects are to provide a novel form of valve which makes the several connections to secure the operation described above by a simple longitudinal movement of the valve with reference to the valve casing, so that at different positions occupied by the valve, different connections will be simultaneously made to secure the functioning of the apparatus, as noted above.

Further objects are to provide a valve which, although having the characteristics previously enumerated, is nevertheless of simple construction and one which may be easily produced by ordinary machine shop processes.

An embodiment of the invention is shown in the accompanying drawings in which:

Figure 4 is a sectional view of the valve showing it in the service position;

Figure 5 is a view of the upper portion of the valve taken at right angles to Figure 4;

Figure 6 is a sectional view through the auxiliary valve.

Figure 1:
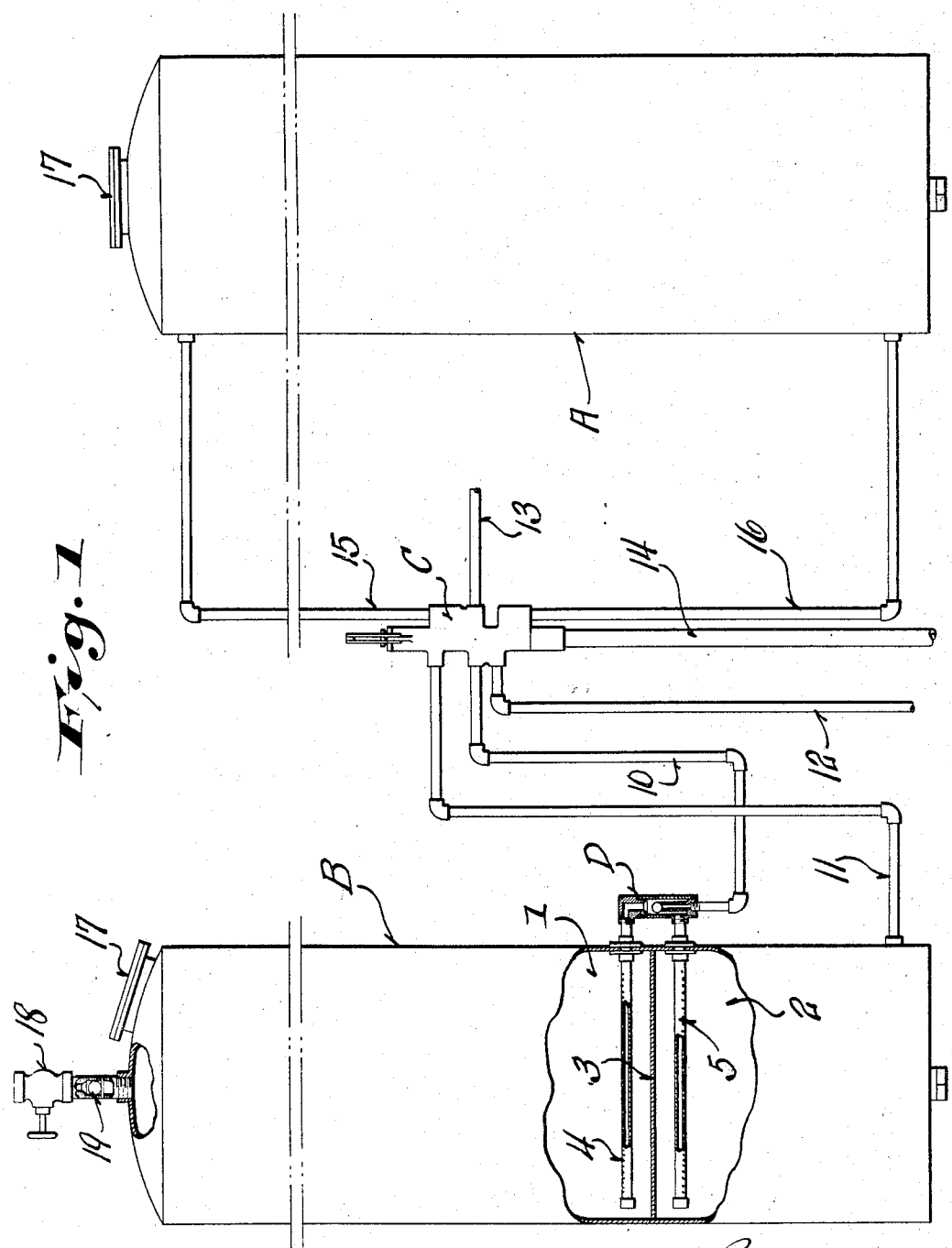
Figure 1 is a side elevation of the apparatus with parts broken away and in section.

Referring to the drawings, it will be seen that the apparatus comprises a softener A which may be in the form of a tank containing the usual softening material, a brine tank B, a manually operable control valve C, and an auxiliary valve D.

The brine tank has an upper main compartment 1 within which salt is placed, a certain amount of water being kept in the tank, as will hereinafter appear. It is provided further with a lower compartment 2 in which the brine collects and which is adapted to supply a measured quantity of brine depending on the design of the apparatus, that is to say, the position at which the transverse partition 3 is located.

A perforated pipe 4 projects outwardly from the bottom of the main compartment 1 or salt compartment, and joins the valve D. The valve D also joins a perforated pipe 5 extending into the brine or measuring compartment 2, as shown in Figure 1. The valve D as will be seen from Figure 6, consists of a tubular body portion 6 which is provided with an internal upwardly extending sleeve 7 upon which the ball or valve proper 8 normally rests. Immediately above the ball, a valve seat is formed in the member 9 which communicates with the pipe 4 previously described. The body 6 communicates with the pipe 5. A supply pipe 10 communicates with the interior of the sleeve 7.

The lower portion of the brine compartment is provided with a brine supply pipe 11 which extends to the valve C, connected in the manner hereinafter described. The pipe 10 also extends to the valve C. Further, it is to be noted from reference to Figure 1, that the valve C is provided with a pipe 12 which is the hard water supply pipe and with a pipe 13 which is the service pipe or soft water supply pipe. It is also provided with a waste pipe 14. In addition to these pipes, the valve C is provided with a pipe 15 leading to the upper portion of the softener tank, and with a valve 16 leading to the lower portion of the softener tank.

If desired, each of the tanks may be provided with drain plugs, as indicated. Preferably, each of the tanks is provided with a removable cap 17 which may be of any suitable construction. The brine tank has its upper portion in communication with the air. It may be provided with a manually controlled valve 18 and with a check valve 19 adapted to close when internal perssure is generated. As will appear hereinafter, either valve 18 or 19 alone may be used or both may be dispensed with. The brine tank B can be readily filled through an opening normally closed by the removable cap 17.

The valve C is provided with an operating plunger or rod 20 which is controlled by means of the hand lever 21. Preferably the hand lever is pivoted intermediate its ends, as shown in Figure 5, to the piston rod or plunger 20, and at one end is connected by means of a link 22 with a bracket 23 carried by the valve C. The valve C also carries a segmental member 24 which is provided with three notches 25, 26, and 27.

The lever 21 is provided with a short stub pin 28 which is adapted to fit in any one of the notches. This is readily accomplished by slightly springing the valve lever 21 laterally when it is desired to disconnect the pin 28 from the notch within which it is seated. The notches 25 and 26 and 27 correspond respectively to service, washing, and brine supplying positions.

The piston rod 20 extends through the fitting or cap 29 of the valve C and preferably through a packing gland 30. The rod 20 is rigidly connected to the piston or plunger 31 of the valve. This plunger 31 is the movable portion of the valve and is preferably cylindrical and fits a correspondingly bored out cylindrical aperture 32 extending through the valve body. The lower portion of the aperture 32 receives the fitting 33 (see, for instance, Figures 2 to 4), and such fitting connects to the waste pipe 14. This fitting is provided with a conical valve seat 34 which is adapted to be closed by a rubber ball or yielding conical member 35 rigidly carried by the lower end of the plunger 31 of the valve. The fitting is provided with a downwardly extending tubular portion 36 located internally thereof so as to produce an ejector action. The space surrounding the tube 36 or nozzle of the ejector communicates with a by-pass pipe 37 which extends upwardly and opens through the port 38 formed in the valve body. The port 38 is controlled by means of an annular groove 39, or opening, formed in the upper portion of the plunger 31 of the valve.

Further, a second port 40 is placed in alignment with, though offset from, the port 37. This port communicates with the brine supply port 41 and consequently with the brine supply pipe 11, as is apparent from Figures 2 to 4.

The body portion is further provided with a port 42 which communicates with the pipe 10 for supplying the brine tank and is provided with a port 43 communicating with the hard water supply pipe 12. The ports 38, 41, 42, and 43 are preferably arranged on one side of the body portion. On the opposite side of the body portion, a port 44 is provided which communicates with the pipe 16 extending to the lower portion of the softener tank. Also a port 45 is provided which communicates with the pipe 15 extending to the upper portion of the tank. A delivery port or soft water port 46 communicates with the service or soft water supply pipe 13.

In addition to these last described ports, the valve body is provided with a port 47 which is the by-pass port, and communicates by means of the by-pass channel or duct 48 with a discharge aperture 49 located adjacent the lower portion of the valve and adapted to be placed in communication with the waste pipe 14 when the valve is in either brine supplying position or washing position. Communication with the discharge pipe is cut off when the valve is in service position, as shown in Figure 4.

The plunger or valve proper 31 is provided with a hollow interior separated into two portions E and F by the partition 50. These interior hollow portions are in communication with a series of ports arranged on opposite sides of the valve. For instance, on one side there are provided the ports 51, 52, 53, and 54. On the other side, the valve ports 55, 56, 57, 58, and 59 are provided for a purpose which will immediately appear.

The ports 51, 57, 58, and 59 are in communication with the hollow interior E. The ports 52, 53, 54, 55, and 56 are in communication with the hollow interior F.

It is believed that by describing the different positions of the valve during the successive stages in operating the apparatus that a clearer understanding of the mode of functioning of the valve and of the entire apparatus will be secured and, therefore, first the service positions will be described, as shown in Figure 4.

As shown in Figure 4, the hard water enters by way of the pipe 12, passes to the interior F of the plunger 31, passes through the port 56, through the port 44 to the pipe 16 extending to the bottom of the tank of the softener. The water after being softened by its passage through the tank returns by way of the pipe 15 and passes through the ports 45 and 59 into the hollow interior E and from thence through the ports 57 and 46 to the service pipe or soft water pipe 13.

Figure 2:
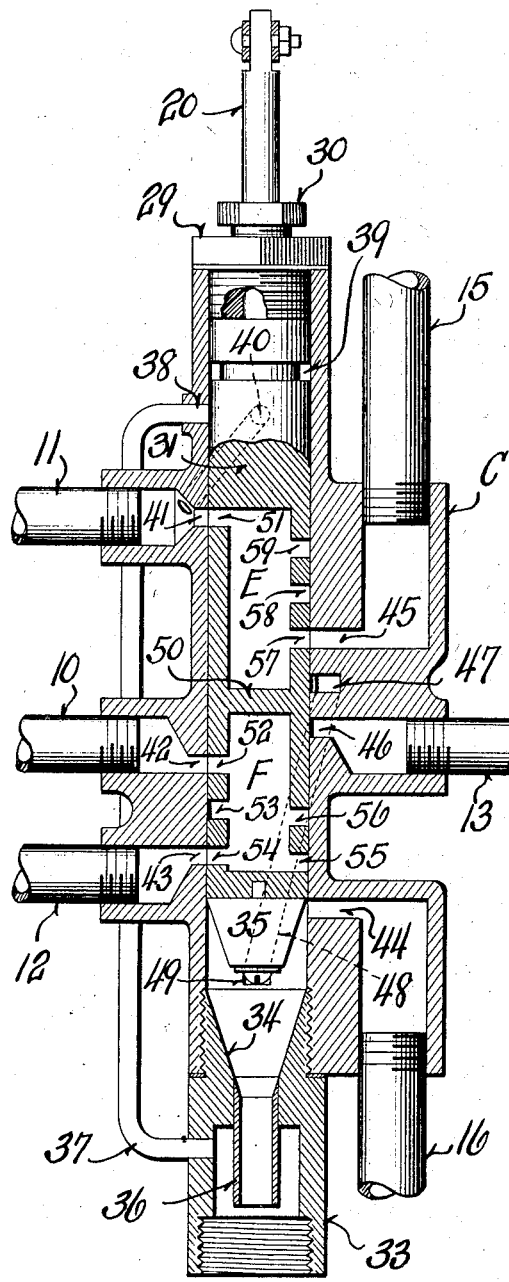
Figure 2 is an enlarged sectional view through the valve showing it in the rejuvenating or brine supplying position.

When it is desired to rejuvenate the softening material, the valve is moved into its uppermost position, as indicated in Figure 2. When in this position, the hard water passes from the pipe 12 through the ports 43 and 54 to the compartment F. From this compartment or hollow interior, the water passes through the ports 52 and 42 to the pipe 10. The water passes from the pipe 10 into the auxiliary valve D and seats the ball 8 against the valve seat. The water flows into the lower compartment or metering compartment. The water flows from the valve D by way of the pipe 5 into the metering compartment 2 of the brine tank. The displaced brine flows through the pipe 11, through the ports 41 and 51 to the upper compartment E of the valve. From this point, the brine flows through the ports 57 and 45 to the pipe 15 and passes downwardly through the softener tank. The used brine or waste water passes from the softener tank through the pipe 16 to the port 44 and discharges through the nozzle 36 of the ejector into the waste pipe 14.

Figure 3:
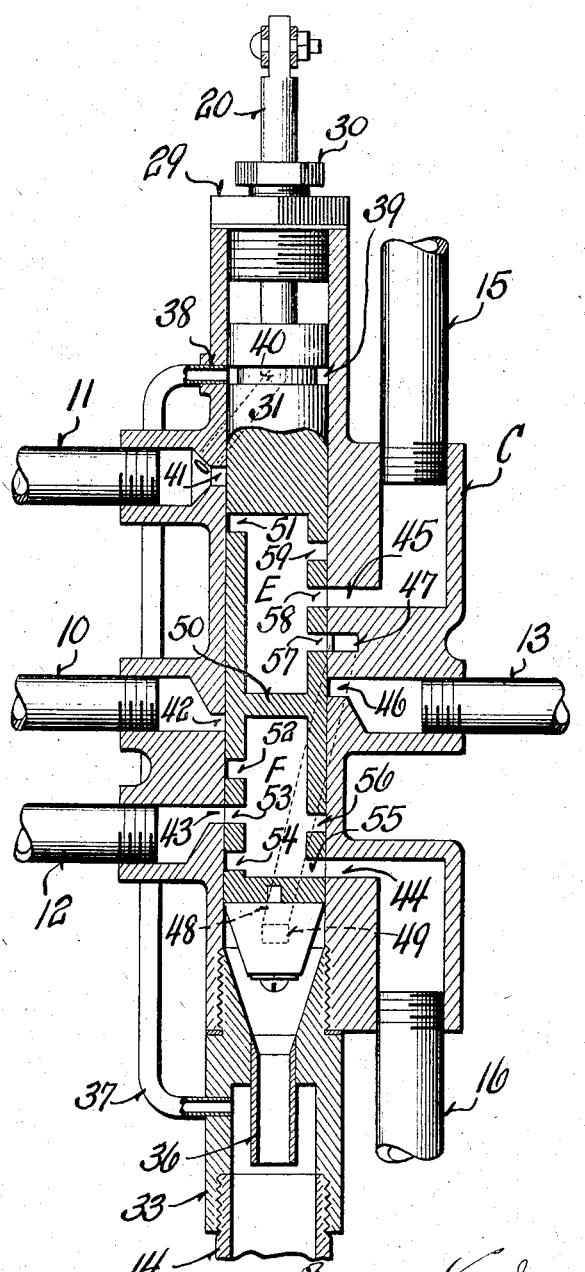
Figure 3 is a sectional view of the valve showing it in the washing position.

When the supply of brine has been used up no harm comes if an additional supply of fresh water passes through the softener tank. However, the timing of the shifting of the valve lever is such that approximately after the entire quantity of brine in the metering compartment has been used up, the valve lever is shifted to position the valve in the washing position, as shown in Figure 3. When in this position the hard water entering by way of the pipe 12 flows through the ports 43 and 53 into the lower compartment F. It flows from this compartment through the ports 55 and 44 to the pipe 16 leading to the bottom of the softener tank. The waste water returns by way of the pipe 15 and passes into the upper compartment E of the valve by means of the ports 45 and 58. From this upper compartment of the valve, the water passes to the by-pass duct by way of the ports 57 and 47. The water discharges through the opening 49 and through the ejector nozzle 36 into the waste pipe.

It is to be noted that when the valve is in washing position that the ports 40 and 38 are placed in communication, the ports 40 communicating with the pipe 11 leading from the bottom of the brine tank. The ejector action produced by the discharging water passing from the nozzle or tubular portion 36 of the ejector sucks a small quantity of water from the brine tank thru the pipes 11 and 37 and consequently lowers the level of the water in the brine tank. This action is permitted as air is free to enter the upper portion of the brine tank.

The slight amount of water removed from the brine tank during the washing operation is such that when the salt is completely used up as, for example, after a predetermined number of operations, the level of the water in the brine tank is such that a new charge of salt may be added to the brine tank without causing it to overflow.

After washing has progressed for a predetermined length of time, the valve is moved into service position and the hard water flows upwardly through the softener tank and to the service pipe.

After a cycle of operations, it is apparent that fresh water now fills the metering compartment 2 and the ball 8 of the auxiliary valve D seats upon the tubular portion 7 and allows communication between the pipes 4 and 5. The upper portion of the brine tank has substantially a saturated salt solution, and this saturated solution percolates through the pipes 4 and 5 and diffuses through the fresh water in the metering compartment or measuring compartment 2, thus producing brine in this compartment.

From actual trials with this apparatus, it has been found that the above described actions take place and consequently no thought on the part of the operator is required for the successful operation of the valve. The operator is merely required to first throw the lever into its uppermost position, thereafter to the intermediate position, and finally to its lowest position, in order to recondition, wash, and reconnect the softener as previously described.

It is planned, in the use of this apparatus, to so design the parts that the upper brine tank may take one bag of salt, for example, a hundred pounds. The cap is removed, the salt added, and thereafter the apparatus is good for approximately ten operations, depending, of course, upon the size of the softener with which it is connected.

It is also apparent that the size of the compartment 2 determines the amount of brine supplied at anyone cycle in the rejuvenation of the softening material. Obviously, in the design of this apparatus, the compartment 2 is exactly proportioned to the needs or the requirements of the softener with which it is to be used.

It is to be noted further that a simple type of valve has been provided by this invention which although having the multiplicity of functions enumerated above, nevertheless may be easily produced.

Although the invention has been described in considerable detail, such description is intended as illustrative rather than limiting as the invention may be variously embodied and as the scope of such invention is to be determined as claimed.

The expressions appearing in the claims, such as "hard water supply port," "soft water delivery port," "brine supply port," "brine delivery port," and similar expressions are used to avoid needless repetitions in the definition of these ports and in stating their successive connections, and are not intended in any sense as limiting.

I claim:

1. A valve for a water softener comprising a body portion provided with a valve receiving aperture, a valve slidably mounted within said aperture and having an upper and a lower compartment, said body portion having a port, a second port, a hard water supply port, a soft water service port, a brine supply port, a brine delivery port, and a waste port, said valve having transverse ports arranged in groups with one group communicating with the upper compartment and the other group communicating with the lower compartment, said valve in one position establishing communication between the hard water port and the first mentioned port, and between the second port and the service port, said valve in another position establishing communication between said hard water port and the brine supply port, between the brine delivery port and the second port, and between the first mentioned port and the waste port.

2. A valve for a water softener comprising a body portion provided with a valve receiving aperture, a valve slidably mounted within said aperture and having an upper and a lower compartment, said body portion having a port, a second port, a hard water supply port, a soft water service port, a brine supply port, a brine delivery port, and a waste port, said valve having transverse ports arranged in groups with one group communicating with the upper compartment and the other group communicating with the lower compartment, said valve in one position establishing communication between the hard water port and the first mentioned port, and between the second port and the service port, said valve in another position establishing communication between said hard water port and the brine supply port, between the brine delivery port and the second port, and between the first mentioned port and the waste port, said valve in a third position establishing communication between said hard water supply port and said first mentioned port, and between said second port and said waste port.

3. A valve for a water softener comprising a body portion provided with a valve receiving aperture, a valve slidably mounted within said aperture and having an upper and a lower compartment, said body portion having a port, a second port, a hard water supply port, a soft water service port, a brine supply port, a brine delivery port, and a waste port, said valve having transverse ports arranged in groups with one group communicating with the upper compartment and the other group communicating with the lower compartment, said valve in one position establishing communication between the hard water port and the first mentioned port, and between the second port and the service port, said valve in another position establishing communication between said hard water port and the brine supply port, between the brine delivery port and the second port, and between the first mentioned port and the waste port, said valve in a third position establishing communication between said hard water supply port and said first mentioned port, and between said second port and said waste port, said valve having a suction creating member operatively connected to said brine delivery port when said valve is in the third position.

4. A valve for a water softener comprising a body portion provided with a valve receiving aperture, a valve slidably mounted within said aperture and having an upper and a lower compartment, said body portion having a port, a second port, a hard water supply port, a soft water service port, a brine supply port, a brine delivery port, and a waste port, said valve having transverse ports arranged in groups with one group communicating with the upper compartment and the other group communicating with the lower compartment, said valve in one position establishing communication between the hard water port and the first mentioned port, and between the second port and the service port, said valve in another position establishing communication between said hard water port and the brine supply port, between the brine delivery port and the second port, and between the first mentioned port and the waste port, said valve having a yielding portion for sealing the waste port when said valve is in the first mentioned position.

5. A valve for a water softener comprising a body portion provided with a valve receiving aperture, a valve slidably mounted within said aperture and having an upper and a lower compartment, said body portion having a port, a second port, a hard water supply port, a soft water service port, a brine supply port, a brine delivery port, and a waste port, said valve having transverse ports arranged in groups with one group communicating with the upper compartment and the other group communicating with the lower compartment, said valve in one position establishing communication between the hard water port and the first mentioned port, and between the second port and the service port, said valve in another position establishing communication between said hard water port and the brine supply port, between the brine delivery port and the second port, and between the first mentioned port and the waste port, said valve in a third position establishing communication between said hard water supply port and said first mentioned port, and between said second port and said waste port, said valve having an ejector connected to said waste port when said valve is in the third position, and having a by-pass port connected to the suction end of said ejector and connected to the brine delivery port when said valve is in the third position.

In testimony that I claim the foregoing I have hereunto set my hand at Madison, in the county of Dane and State of Wisconsin.

BENJAMIN H. TER BEEST.